United States Patent
Verhoog et al.

(10) Patent No.: US 6,296,966 B1
(45) Date of Patent: Oct. 2, 2001

(54) ONE-PIECE BATTERY CONTAINING A DEVICE FOR MEASURING THE INTERNAL TEMPERATURE

(75) Inventors: Roëlof Verhoog, Bordeaux; Alain Genton, Parempuyre, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/174,442

(22) Filed: Oct. 19, 1998

(30) Foreign Application Priority Data

Oct. 20, 1997 (FR) .................................................. 97 13094

(51) Int. Cl.[7] .................................................. H01M 10/48
(52) U.S. Cl. ................................ 429/93; 429/90; 429/62; 429/186; 429/163
(58) Field of Search ................................ 429/93, 90, 99, 429/7, 92, 163, 151, 61, 62, 186

(56) References Cited

U.S. PATENT DOCUMENTS

| | | | |
|---|---|---|---|
| 4,482,614 | * 11/1984 | Zito, Jr. .................................... | 429/70 |
| 5,248,927 | 9/1993 | Takei et al. ............................... | 320/2 |

FOREIGN PATENT DOCUMENTS

| | | |
|---|---|---|
| 0 638 951 A2 | 2/1995 | (EP) . |
| 0 739 048 A1 | 10/1996 | (EP) . |
| 2 382 107 | 9/1978 | (FR) . |
| 2 553 894 A1 | 4/1985 | (FR) . |
| 4-286876 | * 10/1992 | (JP) .......................................... 320/2 |
| 5-326024 | 12/1993 | (JP) . |
| 6-133468 | 5/1994 | (JP) . |

OTHER PUBLICATIONS

Patent Abstracs of Japan, vol. 016, No. 267 (E–1217), Jun. 16, 1992 corresponding JP 04 061762 A (Matsushita Electric Works Ltd) Feb. 27, 1992).
Patent Abstracts of Japan, vol. 097, No. 008, Aug. 29, 1997 corresponding to JP 09 106836 A (Matsushita Electric Ind Co Ltd) Apr. 22, 1997.
Patent Abstracts of Japan, vol. 008, No. 044 (E–229), Feb. 25, 1984 corresponding to JP 58 201269 A (Matsushita Denki Sangyo KK) Nov. 24, 1983.

* cited by examiner

Primary Examiner—Gabrielle Brouillette
Assistant Examiner—Raymond Alejandro
(74) Attorney, Agent, or Firm—Sughrue, Mion, Zinn, Macpeak & Seas, PLLC

(57) ABSTRACT

A sealed one-piece battery comprises a container having at least one wall and divided into contiguous compartments which receive electrode assemblies by at least one partition attached to the wall. A device for measuring the temperature of the electrode assemblies comprises at least one sensor disposed in a housing formed within the thickness of at least one of the partitions. The opening of the housing is on the external face of the wall.

13 Claims, 5 Drawing Sheets

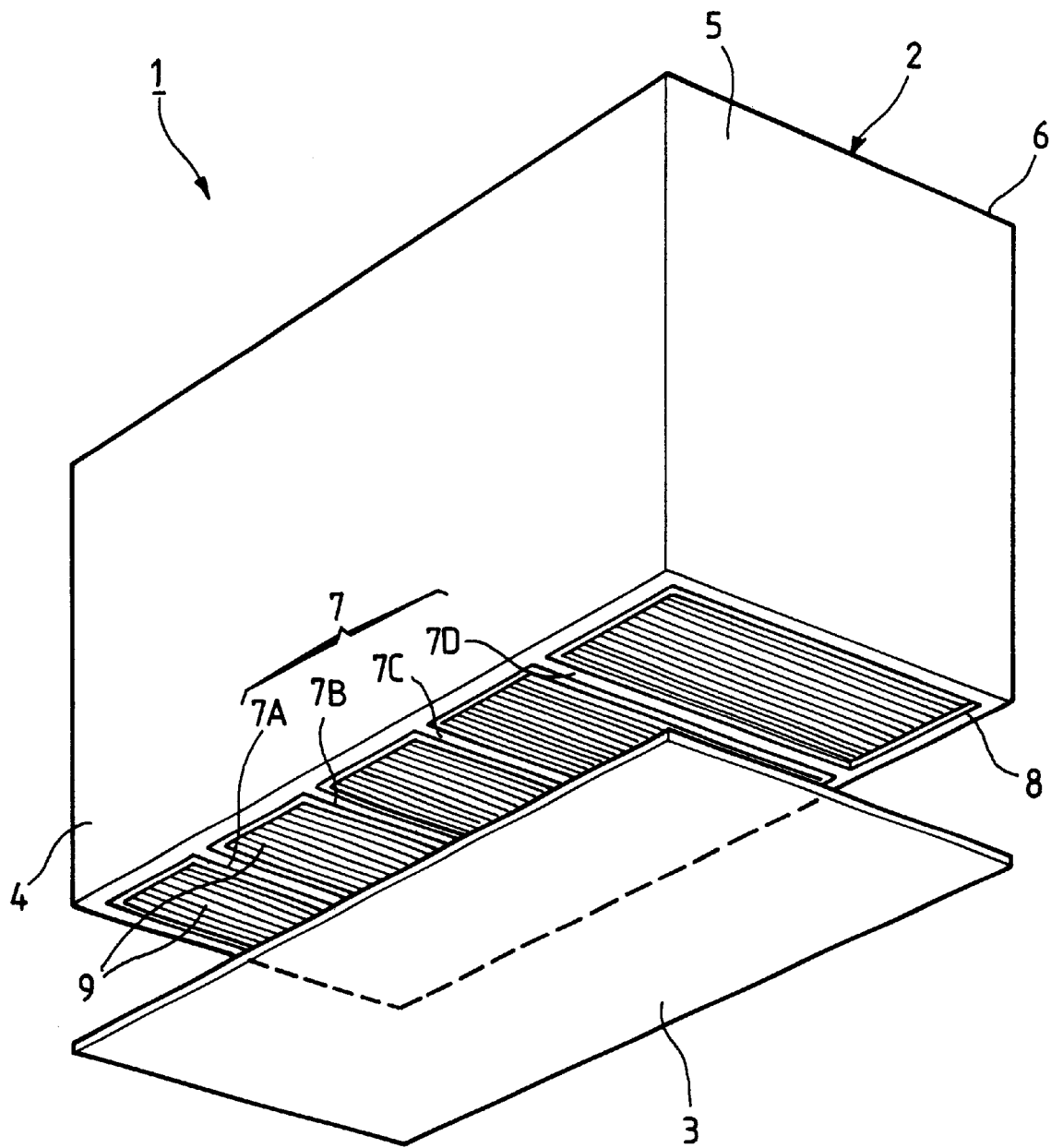
FIG_1

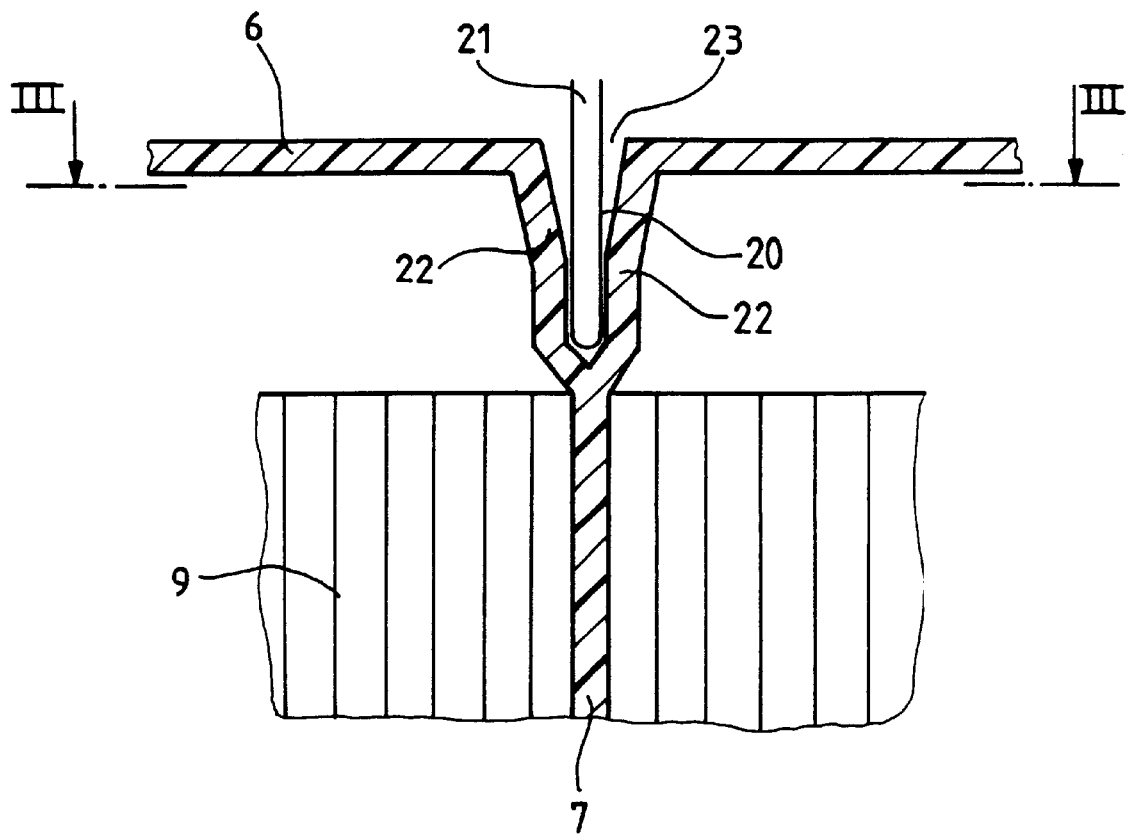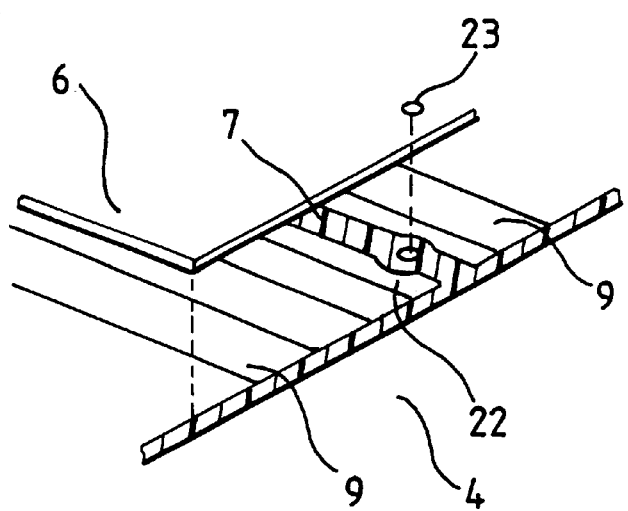

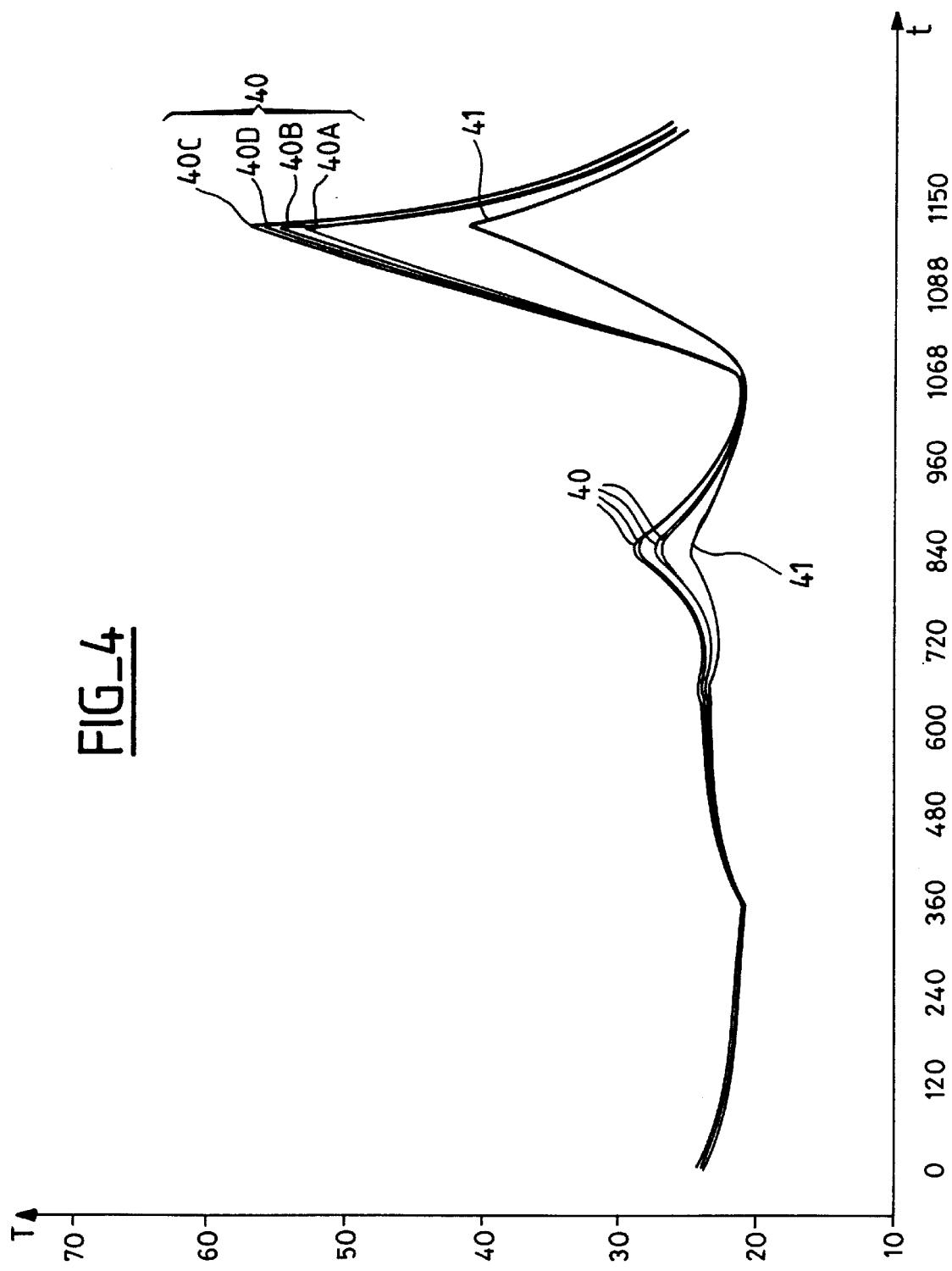
FIG_4

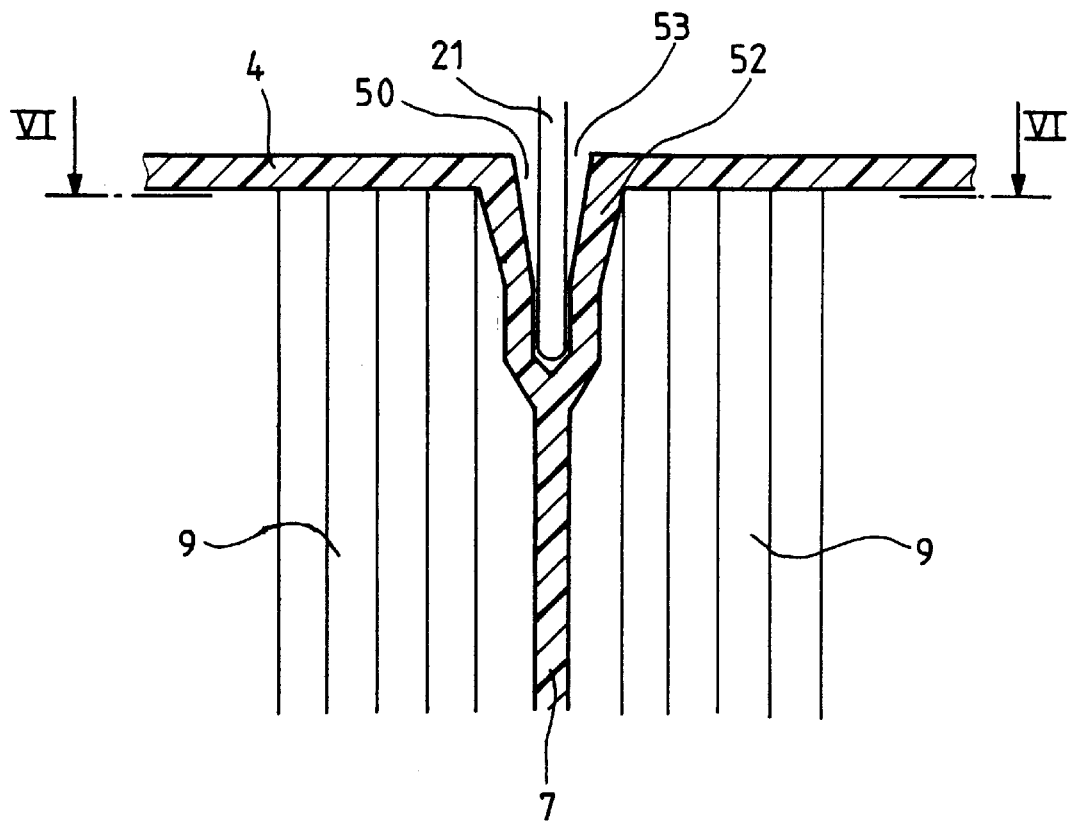
FIG_5
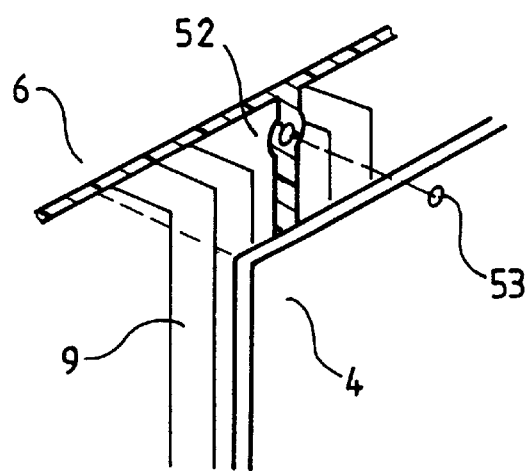
FIG_6

FIG_7
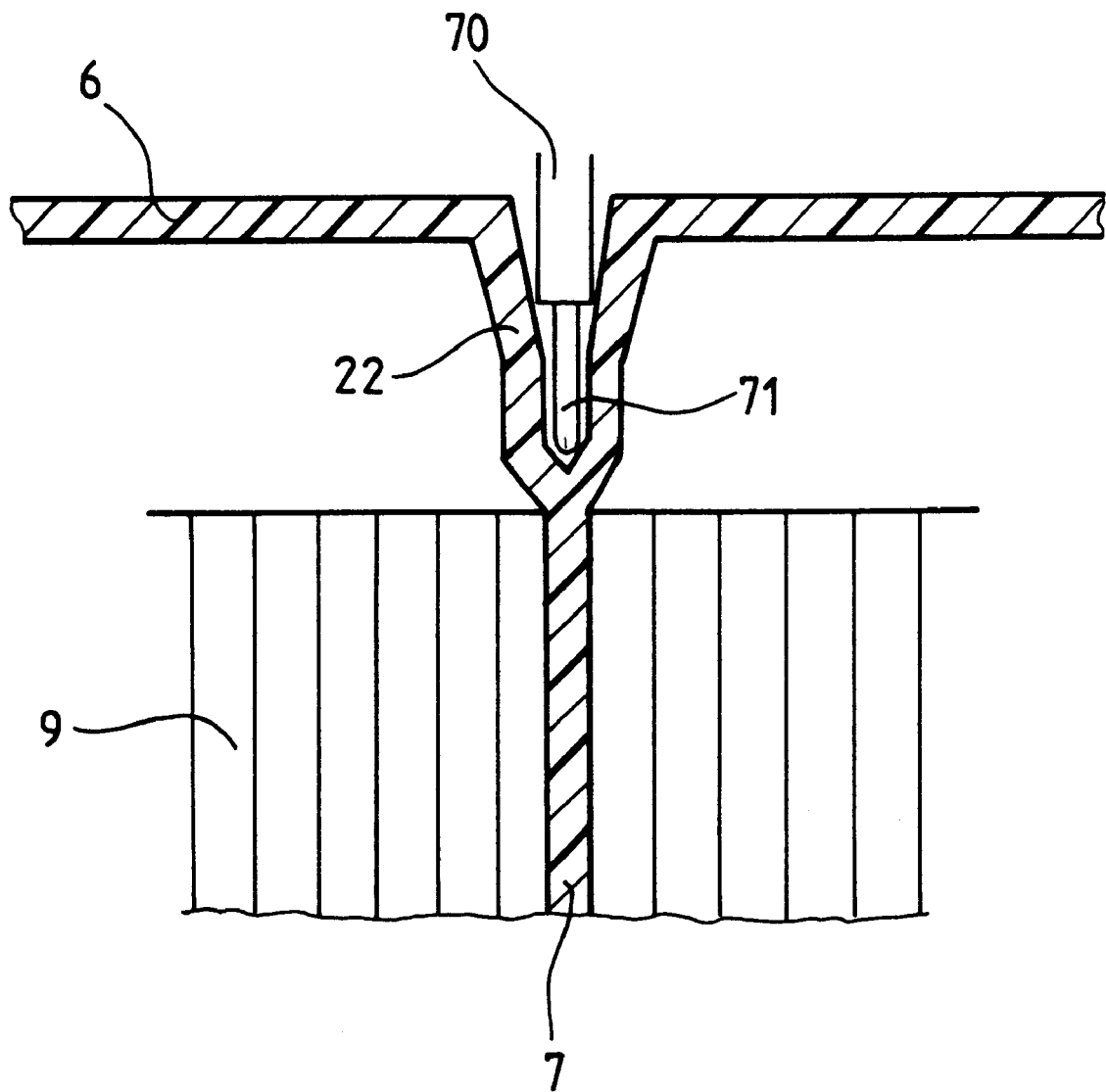

ONE-PIECE BATTERY CONTAINING A DEVICE FOR MEASURING THE INTERNAL TEMPERATURE

BACKGROUND OF THE INVENTION

1. Field of the Invention

The present invention concerns a one-piece battery comprising a device adapted to measure the temperature of the electrode assemblies contained in the compartments of the battery.

2. Description of the Prior Art

In a one-piece design the cells of the battery are contained in the compartments of a single container separated by partitions. The container is generally made of a plastics material and prism-shaped. Each cell comprises an electrode assembly of alternating positive and negative electrodes separated from each other by a separator.

The temperature of the electrode assembly varies during successive charging and discharging cycles. The charging (or discharging) time can be monitored by measuring the temperature. The accuracy with which the end of charging is detected depends on the quality of the temperature measurement. This reduces overcharging and extends the service life of the battery. Also, if a malfunction occurs the temperature of the electrode assembly can rise suddenly. The safety of the user depends on how quickly the thermal anomaly can be detected. Also, a one-piece battery is generally associated with a cooling device whose efficiency must be monitored.

The measurement is routinely performed by a temperature sensor fixed to one of the external faces of the one-piece battery by an adhesive. A sensor located in this position cannot measure the real temperature of the electrode assemblies and is exposed to all the thermal disturbances external to the battery. There is also the risk of the sensor becoming detached from the wall of the container.

Document EP-0 638 951 describes a one-piece battery to which an end compartment is added to accommodate a safety device including a temperature sensor. The sensor is supported by a lipped member upstanding from the partition separating the end compartment from the adjacent compartment containing an electrode assembly. This arrangement has a number of drawbacks. Firstly, the accuracy with which the temperature is measured in this way is insufficient. In this position the compartment at the end of the battery is exposed to external temperature variations. The sensor reacts to variations in the temperature of the adjacent electrode assembly but it is less sensitive to the temperature of the other electrode assemblies. Secondly, temperature variations are detected with a time-delay. The thermal path between the electrode assembly and the sensor is long, especially for the electrode assemblies at the other end of the battery. Adding the end compartment significantly increases the overall size of the battery and reduces its capacity per unit volume.

Document EP-0 739 048 proposes placing a temperature sensor in an orifice terminating near the upper part of the electrode assembly, the orifice being closed off by an adhesive. The distance between the sensor and the upper part of the electrode assembly can vary according to the dimensional tolerances for the height of the electrodes. Although this arrangement can measure a temperature very close to the real temperature of the electrode assembly, heat transfer only by radiation cannot detect temperature variations with sufficient accuracy. The composition of the gas mixture above the electrode assembly varies during cycling, is richer in hydrogen at the end of charging and can change if the relief valve opens. The volume occupied by the temperature measuring device is still too great.

There is a need for a one-piece battery with a capacity per unit volume at least equal to that of existing batteries and with an extended service life. The battery must also be safer for users.

An aim of the present invention is to propose a one-piece battery including a smaller device for measuring the temperature of the electrode assemblies so that the internal temperature is measured and its variations are monitored more reliably, faster and more accurately than in prior art batteries.

SUMMARY OF THE INVENTION

The present invention consists in a sealed one-piece battery comprising a container having a wall and divided into contiguous compartments adapted to receive electrode assemblies by a partition attached to the wall and a device for measuring the temperature of the electrode assemblies comprising measuring means disposed in a housing formed within the thickness of at least one of the partitions so that the opening of the housing is on the external face of the wall.

The electrode assemblies are placed in the compartments in contact with the partitions. The heat generated within the electrode assembly is transferred to its external surface, in particular by the electrolyte that impregnates the electrodes and the separator. Heat transfer from the electrode assembly to the measuring means is effected principally by conduction in the part of the compartment in direct contact with the electrode assembly. In the part of the partition above the electrode assembly it is additionally effected by indirect contact through the intermediary of the separators that are impregnated with electrolyte and/or by radiation.

Each compartment is therefore exposed to changes in the temperature of the electrode assemblies on either side of it. The housing formed within the thickness of a partition is therefore in close thermal contact with the surface of the adjacent electrode assemblies. Its temperature is practically the same as that of the electrode assemblies and changes immediately with the least variation therein because the heat path is short. The measuring means disposed therein therefore provide an accurate measurement of the instantaneous temperature of the electrode assemblies. The part of the housing containing the sensitive part of the measuring means is entirely contained within the partition: there is no contact with the exterior of the container and it is not exposed to thermal disturbances of the environment.

Creating the housing does not increase the volume of the battery. The the level of the top face of the electrode assembly, so occupying a space that is usually unoccupied. To obtain the most accurate possible temperature measurement without reducing its capacity per unit volume the battery can be equipped with a plurality of judiciously distributed housings each containing measuring means.

Access to the housing is obtained from the exterior face of the wall, in line with the partition. The measuring means are therefore accessible at all times from the exterior of the battery. They can therefore be checked or changed easily, if required.

The measuring means can comprise a temperature sensor, for example a transistor or a thermocouple. Their end can be of circular, oval, square or rectangular section, for example.

To minimize the additional thickness of the partition at the location of the housing, its end is preferably flattened. The general shape of the housing can therefore be that of a rectangular parallelepiped with straight or curved shorter sides and with the longer sides parallel to the faces of the partition.

To reduce further the size of the measuring means at the level of the electrode assembly the end of the sensor entering the housing can be extended by a thermal conductor of smaller size, the function of which is to transmit heat to the sensor. The conductor preferably has a small cross-section and can be flattened.

In a preferred embodiment said wall is horizontal. This enables the one-piece batteries to be assembled together with their vertical faces in contact. In this case the horizontal top face of the batteries can carry not only the openings of the housings containing the temperature measuring means but also the current input and output terminals, one or more orifices for filling them with electrolyte, relief valves protecting against overpressure, inlet and outlet tubes for the heat-conveying fluid, etc.

Said wall and said portion are preferaby in one piece. The walls and the partitions of the container are molded in one piece. After the electrode assemblies are inserted the bottom, which is initially a separate part, is fitted and heat welded into place.

The one-piece battery of the present invention can be used in particular for vehicle starting and traction (railroads, road vehicles such as automobiles or motorcycles, etc) and emergency power (lighting, railroads). The one-piece design greatly increases energy per unit volume and energy per unit mass, which is particularly advantageous in the case of an electric vehicle. The battery can also be a lead-acid battery, a nickel battery or a lithium battery, for example.

The invention will be better understood and other advantages and features will become apparent on reading the following description given by way of non-limiting example and accompanied by the appended drawings.

BRIEF DESCRIPTION OF THE DRAWINGS

FIG. 1 shows a one-piece battery of the present invention comprising a temperature measuring device.

FIG. 2 is a vertical part-sectional view of the battery.

FIG. 3 is a part-sectional perspective view taken along the line III—III of the device for measuring the temperature of the battery.

FIG. 4 shows the evolution of the temperature of the one-piece battery from FIG. 1 measured at several positions with the temperature T in °C. plotted on the vertical axis and the time t in minutes plotted on the horizontal axis.

FIG. 5 is a horizontal part-sectional view of a variant of a one-piece battery in accordance with the invention comprising a temperature measuring device.

FIG. 6 is a part-sectional perspective view taken along line VI—VI of the device for measuring the temperature of the battery from FIG. 5.

FIG. 7 is a vertical part-sectional view of another variant of a one-piece battery of the invention comprising a temperature measuring device.

DETAILED DESCRIPTION OF THE PREFERRED EMBODIMENTS

The one-piece battery of the invention shown in FIG. 1 comprises a container made up of a one-piece tank 2 and a bottom 3 that is heat welded to the tank 2 to seal the battery 1. The tank 2 has longitudinal walls 4, lateral walls 5 and a transverse top part 6. It is divided by partitions 7 perpendicular to and attached to the longitudinal walls 4 and transverse top part 6. The partitions delimit contiguous compartments 8 containing electrode assemblies 9.

In a first variant of the invention a housing 20 is provided in at least one of the partitions 7 to accommodate a sensor 21 as shown in the vertical section of FIG. 2. The housing 20 is delimited by two half-partitions 22 extending the partition 7. It has a depth of approximately 1 mm to 2 mm. The horizontal section of FIG. 3 shows that the housing 20 opens onto the transverse top part 6 via an opening 23 delimited by the distance between the two half-partitions 22. Separators (not shown) emerging from the top part of the electrode assembly together are in contact with the half-partitions 22.

This arrangement has the advantage of enabling a plurality of one-piece batteries to be assembled together one beside the other, the temperature being measured on the top of the one-piece battery. The longitudinal walls 4 can be provided with a cooling device, for example that described in European patent application EP-0 596 778.

The evolution of the internal temperature of a battery in accordance with the invention having the temperature measuring device shown in FIGS. 2 to 3 placed on each of the partitions 7A through 7D is measured. The temperature is measured during discharging at a rate 2 lc (where lc is the current required to discharge the nominal capacity of the battery in one hour) which follows charging at 0.2 lc followed by overcharging at 0.05 lc. Curves 40A through 40D in FIG. 4 show the temperature variation measured at the partitions 7A through 7D, respectively.

For comparison the variation in the temperature measured by a sensor based on the outside face of the wall 5 is shown (curve 41). The measured temperatures are very similar at the beginning of the discharge (t<720 min.). When the temperature rises strongly and quickly within the electrode assemblies the curve 41 does not vary as much as the curves 40 (t≈840 min. or 1 098 min.). After approximately 1 098 minutes of discharge the temperature differences read off from the curves 40 and the curve 41 can exceed 15° C.

FIG. 5 shows another variant of the battery in accordance with the invention in which the sensor 21 is disposed in a housing 50 delimited by two half-partitions. The housing 50 opens onto the longitudinal wall 4 through an opening 53 than can be seen in the FIG. 6 section.

In another variant (not sown) the sensor 21 can be placed in a housing opening onto the bottom 3. The opening in the bottom 3 must be precisely aligned with the housing in the partition 7 when the heat welding is carried out.

If the overall size of the sensor 70 is still too great it can be extended by a heat conductor 71 of smaller cross-section, as shown in FIG. 7.

There is claimed:

1. A sealed one-piece battery comprising:
    a container defined by walls;
    at least one partition, attached to at least one of said walls, and dividing said container into contiguous compartments adapted to receive electrode assemblies;
    a housing provided along a thickness of said at least one partition, said housing being delimited by two half-portions extending from said at least one partition, said housing opening on an external face of one of said at least one wall via an opening delimited by a distance between said half-partitions; and
    a device for measuring the temperature of said electrode assemblies, said temperature measuring device being disposed in said housing.

2. The battery claimed in claim 1 wherein said measuring device comprises a temperature sensor.

3. The battery claimed in claim 2 wherein an end of said temperature measuring device is flattened.

4. The battery claimed in claim 3 wherein said housing has a generally rectangular parallelepiped shape cross-section.

5. The battery claimed in claim 1 wherein said sensor is extended by a heat conductor.

6. The battery claimed in claim 1 wherein said wall adjacent to said at least one partition is horizontal.

7. The battery claimed in claim 6 wherein said wall and said at least one partition are formed as a single piece.

8. The battery claimed in claim 1, further comprising an electrode assembly in each of said contiguous compartments.

9. The battery claimed in claim 1, wherein said housing is formed so that an additional thickness of said at least one partition is located above a level of a top face of said electrode assemblies.

10. The battery claimed in claim 1, wherein said electrode assemblies are placed in said contiguous compartments in contact with adjacent ones of said at least one partition.

11. The battery claimed in claim 1, wherein said opening in said housing is formed in a top wall.

12. The battery claimed in claim 1, wherein said opening in said housing is formed in a side wall.

13. The battery claimed in claim 1, wherein said opening in said housing is formed in a bottom wall.

* * * * *